Aug. 17, 1943.   F. H. FANNING   2,326,848
SURFACE WORKING METHOD
Original Filed Sept. 2, 1939   8 Sheets-Sheet 1

INVENTOR
Fred H. Fanning
BY
ATTORNEY

Aug. 17, 1943.  F. H. FANNING  2,326,848
SURFACE WORKING METHOD
Original Filed Sept. 2, 1939  8 Sheets-Sheet 5

INVENTOR
Fred H. Fanning
BY
ATTORNEY

Aug. 17, 1943.　　　　F. H. FANNING　　　　2,326,848
SURFACE WORKING METHOD
Original Filed Sept. 2, 1939　　8 Sheets-Sheet 6

INVENTOR
Fred H. Fanning
BY
ATTORNEY

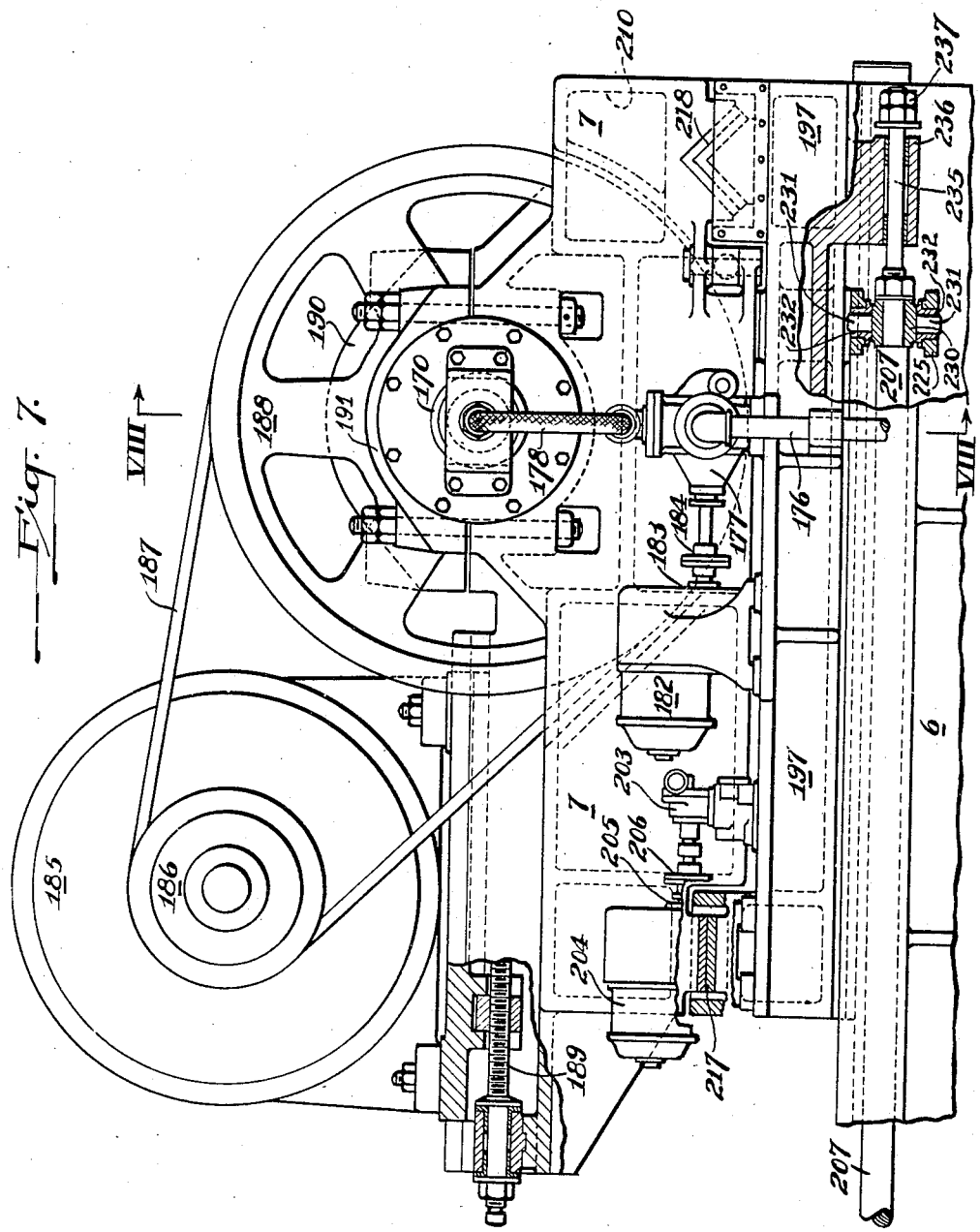

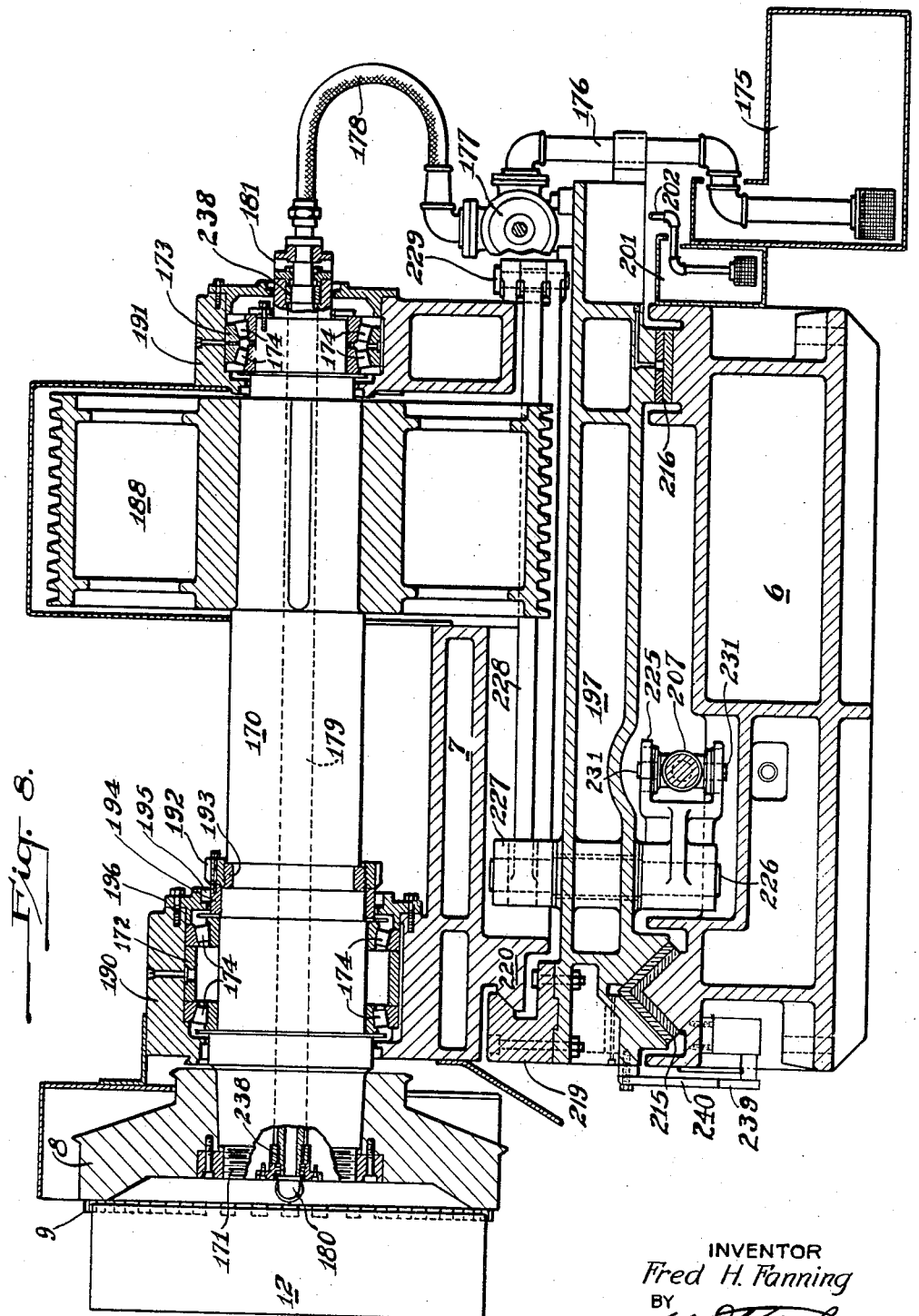

Patented Aug. 17, 1943

2,326,848

UNITED STATES PATENT OFFICE 2,326,848

SURFACE WORKING METHOD

Fred H. Fanning, Pittsburgh, Pa., assignor to Blaw-Knox Company, Pittsburgh, Pa., a corporation of New Jersey Original application September 2, 1939, Serial No. 293,269. Divided and this application July 2, 1940, Serial No. 343,604

1 Claim. (Cl. 99—11)

This application is a division of my application Serial No. 293,269, filed September 2, 1939, for Improvements in surface material making, and relates particularly to methods of performing working operations on the surfaces of various work pieces.

The present invention relates to material working operations, and more particularly to removing surface material from sides of ingots, billets, slabs, plates, and the like by an operation commonly known as "scalping."

The machine to be described is especially designed for removing appreciable amounts of surface metal from the sides or opposite faces of metal slabs. Particularly in the working of aluminum and like metals and alloys, it has been found desirable to remove surface metal of irregular composition, physical properties, and contour from slabs in either the as-cast condition or the partially-worked condition by a machining operation. It is with the problem of so removing surface metal that the embodiment of the invention here particularly described is best adapted to be employed.

In prior scalping practice it has been customary, in some instances, to mount a slab to be scalped in a work holder and to traverse the work holder and slab past a rotary, milling-type cutter which operates on a face of the slab exposed to the cutter as the slab is held in the holder.

One method of operation under the above practice has included loading the slab into the holder at the loading position, traversing the holder and slab past the cutter, unloading the work from the holder at a position distant from the loading position, traversing the empty holder back to the loading position, and thereafter reinstituting the cycle of operations. Another method of operation under the above practice has included loading the slab into the holder, advancing the cutter into operable position, traversing the holder and slab past the cutter, retracting the cutter out of operable position, returning the holder and slab back to the loading position, there unloading the slab, and thereafter reinstituting the cycle of operations. In either of the above described methods of operation the form of the machine and the method used have involved considerable amounts of waste time, in that the cutter could not be usefully employed during appreciable lengths of time, for instance, while the work holder is being returned to loading position, or while a slab is being removed and a new slab is being loaded into the work holder.

A means of saving time in the operation of a scalping machine is embodied in the form of machine described herein, which machine employs a work holder comprised of two work supporting units. These work supporting units are arranged in one work holder on opposite sides thereof so as to be adapted to alternate presentation to the work loading apparatus and to the cutting tool. Thus an ingot or slab may be loaded or unloaded, inverted and loaded, as desired, at one position with respect to a work supporting unit temporarily located adjacent thereto, while another ingot or slab is being held in an opposite work supporting unit facing a cutting tool, by means of which an ingot or slab may be scalped while the necessary operations are being made at the first mentioned work supporting unit.

The presently preferred arrangement provides for the location of two oppositely disposed work supporting units in a common work holder which is rotatable about an axis midway between the work supporting units, so that by a simple rotary motion a newly loaded slab and a scalped slab may exchange positions in a very short period of time and thus make possible the rapid reinstitution of the scalping or surface machining operation.

The above mentioned novel type of work holder has been associated in the present invention with a cutting tool mounted and operated in a novel manner, and with loading, unloading, inverting, and conveying means of novel construction for use adjacent one work supporting position.

By comparison of the method and machine described hereinafter with the above mentioned methods and apparatus, several objects and advantages can be readily appreciated. One object of the present invention is the elimination of lost time in methods of surface metal working, especially as respects the period in which the metal working tool is employed for actually removing metal.

Another object of the invention is the provision of a novel form of work holder having multiple work supporting units therein. A further object is the provision of novel means for securing rigidity of the work holder. Another object is the provision of simple means for delivery of power to various motive mechanisms located in a rotatable work holder.

Another object is the provision in a surface metal working machine of improved apparatus for carrying out improved methods for receiving, loading, unloading, inverting, and discharging slabs at one position relative to the work supporting units. Another object of the invention is improved slab handling means in association with a multiple unit work holder.

A further object is the provision of improved work positioning mechanisms associated with each work supporting unit operable in association with the work loading apparatus arranged to set a slab into a work supporting unit of a work holder.

Another object is the provision of a multiple unit work holder adapted to support work pieces for simultaneous presentation to cutting position and to loading and unloading position or positions.

A further object is the provision of novel means for supporting, advancing, and traversing a movable surface metal working tool past the work. A further and more particular object is the provision in such novel means of means for advancing and traversing the tool through one motive mechanism. It is also an object to arrange the last named means to perform both the functions of advancing and traversing the tool and of retracting and returning the same after completion of a working operation.

Other objects and advantages of the present invention will become apparent upon reading the accompanying description of the preferred form of the invention in connection with the drawings. The objects particularly set forth are to be considered as intended to express the general purposes of the invention described, either singly or in combination, and for the attainment of the claimed methods.

In the drawings:

Fig. 7 is an enlarged rear view, partly sectioned, of the cutter head carriage and cutter drive mechanism; and Fig. 8 is a section through the cutter head mechanism and carriage therefor to the same scale as Fig. 7 and taken on the line VIII—VIII of Fig. 7, this view being a section similar to the end elevation shown in Fig. 3.

Figure 1:
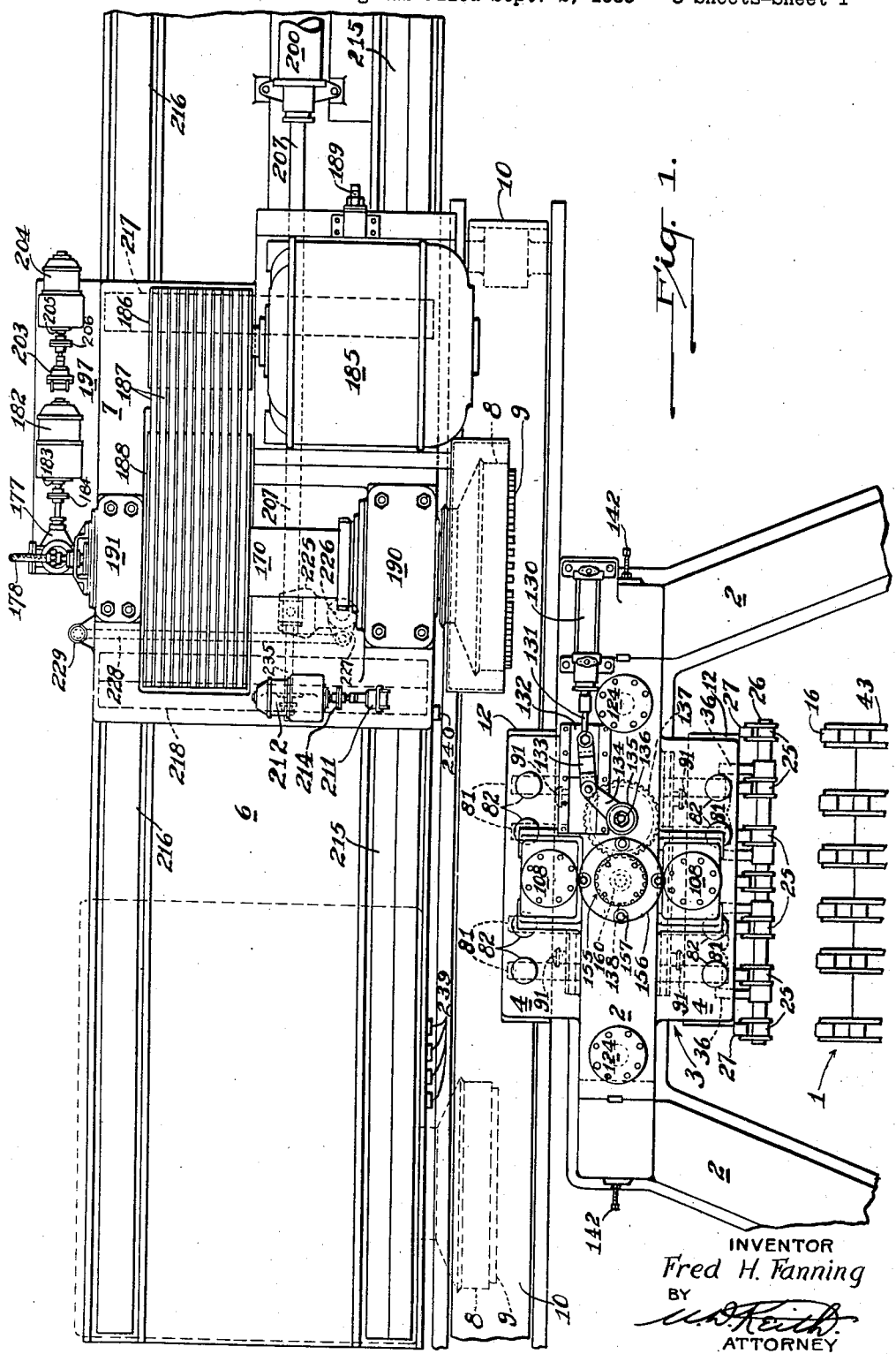
Fig. 1 is a plan view of a preferred form of slab or ingot scalping machine showing the work manipulator, the work holder and frame therefor with slabs located therein, the chip conveyor, and the cutting mechanism (the work manipulating mechanism being partially removed in this figure)
Figure 2:
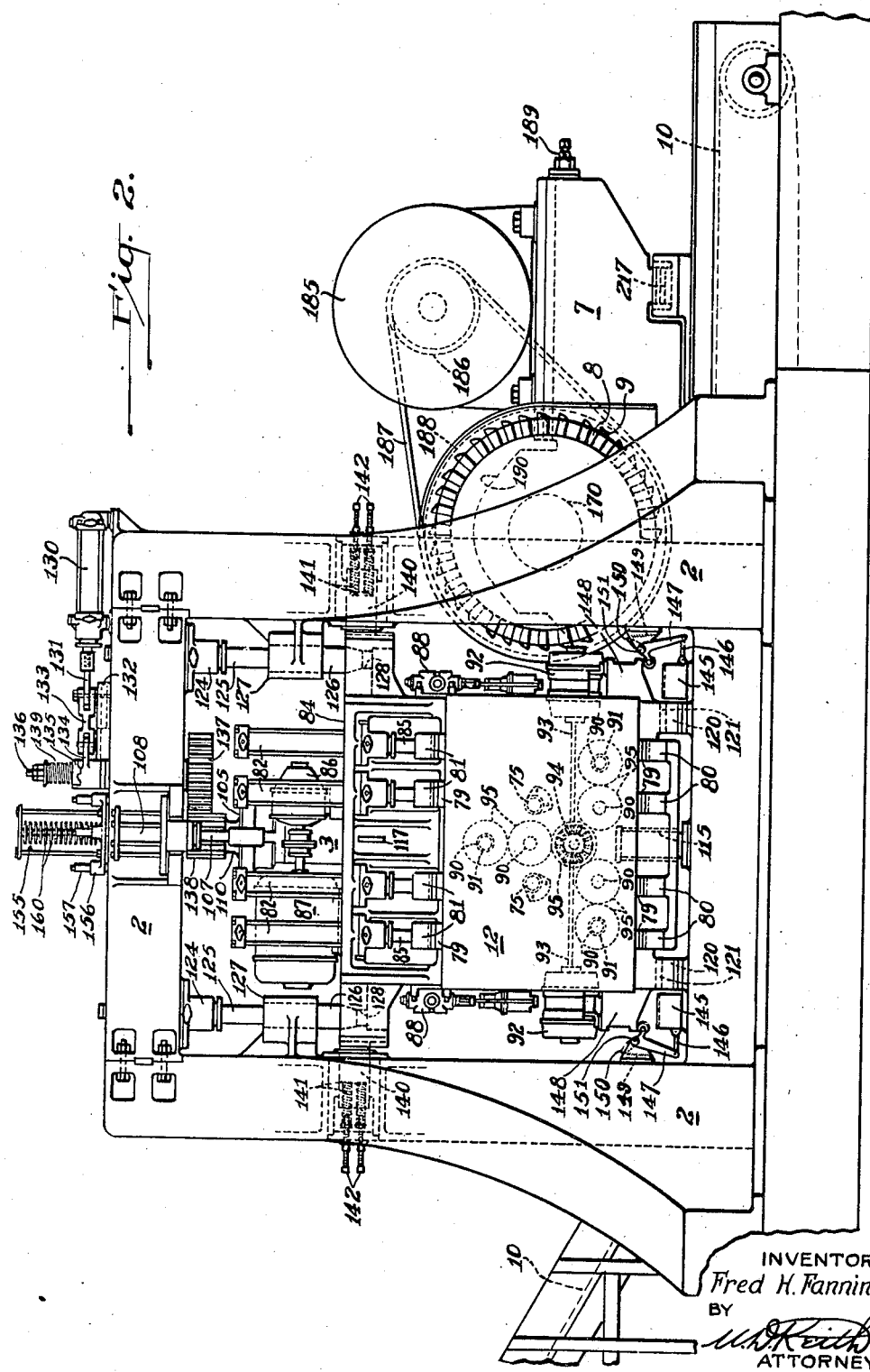
Fig. 2 is a front elevation of the machine shown in Fig. 1 showing the general arrangement of the parts with a slab shown therein (the work manipulating mechanism being removed)
Figure 3:
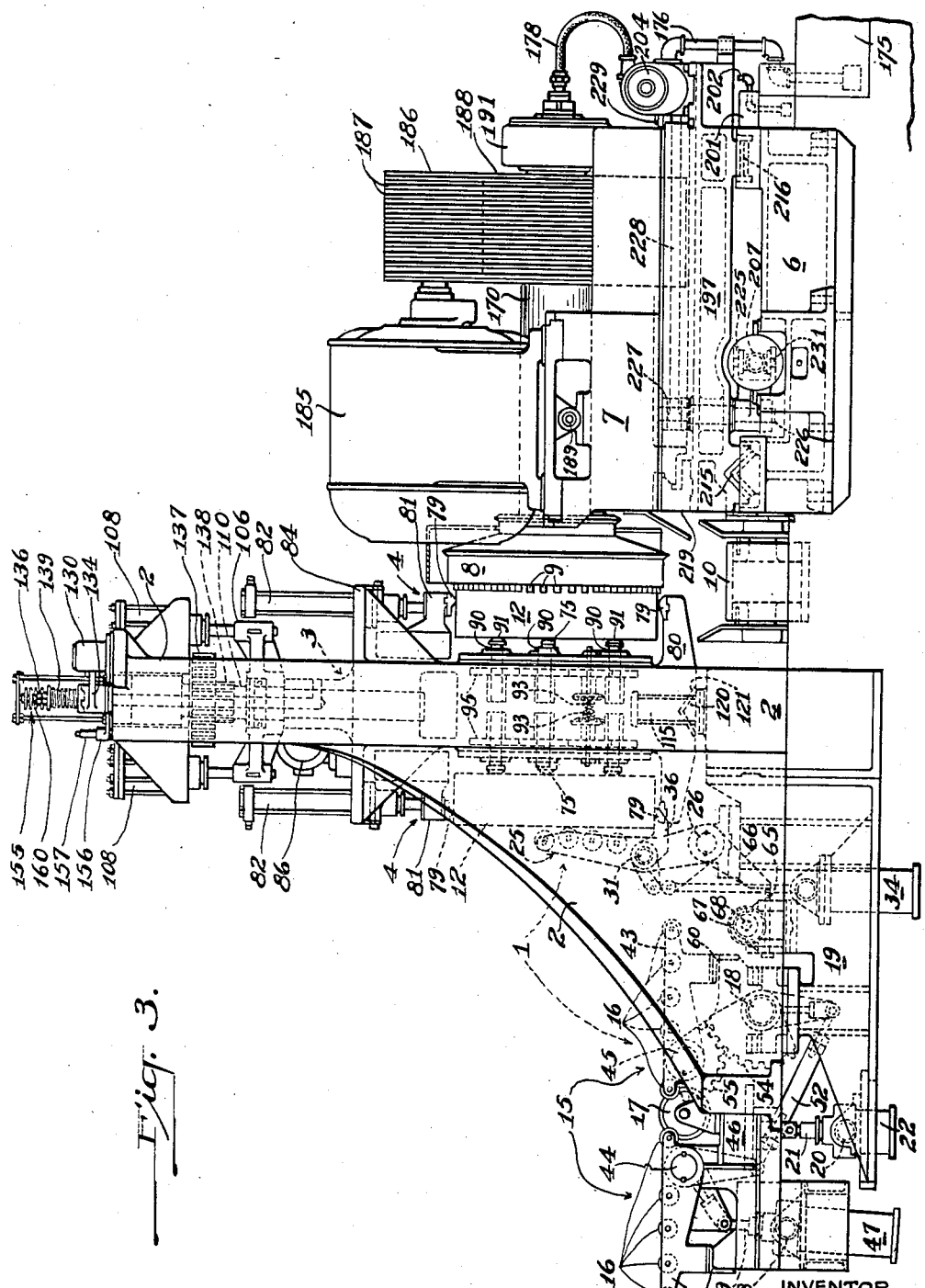
Fig. 3 is an end elevation of the machine shown in Figs. 1 and 2 with slabs shown therein and showing also the work manipulating mechanism and work holder in side elevation.

Referring to the drawings, Figs. 1, 2, and 3 show the general arrangement of the preferred embodiment of the invention which may be said to be comprised of a work manipulator 1 adapted to function also as part of a conveying means for delivering slabs or ingots to or from the apparatus, a main frame 2, a rotatable work holder 3 comprised of two work supporting units 4 in which the slabs may be clamped and held for surface machining, a carriage bed 6, a movable cutter carriage 7, a cutter head 8 incorporating a cutter 9 which is adapted to be traversed past a slab for removal of surface metal, and a chip conveyor 10 (only partially shown in the drawings) for disposal of scalpings or chips removed by the cutter, the latter having no direct bearing on the novel mode of operation of the machine.

Reference numerals 12 indicate slabs or ingots located in the supporting units 4 (and shown dotted in process of being inverted in Fig. 4); and it will be noted by reference to Figs. 1 and 3 that two slabs 12 may be located in holder 3 at one time, one on the cutter side of the holder and one on the manipulator side of the holder. As will be described later in detail, the holder 3 is rotatable about its vertical central axis so that a slab loaded into one supporting unit 4 may be presented to the cutter 9 by rotation of the holder, and so that a scalped or machined slab may be re-presented to the manipulator 1, either to be discharged if then finished on both sides, or to be reversed when desired and reloaded into the holder if a side has yet to be finished, or refinished in case of insufficient scalping on its first pass through the machine.

In the embodiment of the invention shown, the manipulator 1 and the holder 3 are mounted in fixed positions relative to the cutter head 8 which latter, on its carriage 7, is traversable over its bed 6 past the work held in a work supporting unit presented thereto. This arrangement, rather than a reciprocatory mounting of the holder 3, is preferable because it permits greater rigidity in the mounting of the holder than would be obtained if it were movably mounted; and a single fixed location of the manipulator is desirable to simplify and expedite the handling of slabs. This arrangement also makes possible the use of a novel means for advancing, retracting, and traversing the cutter head 8, but the invention is not to be considered limited to this arrangement.

*Work manipulator*

Figure 4:
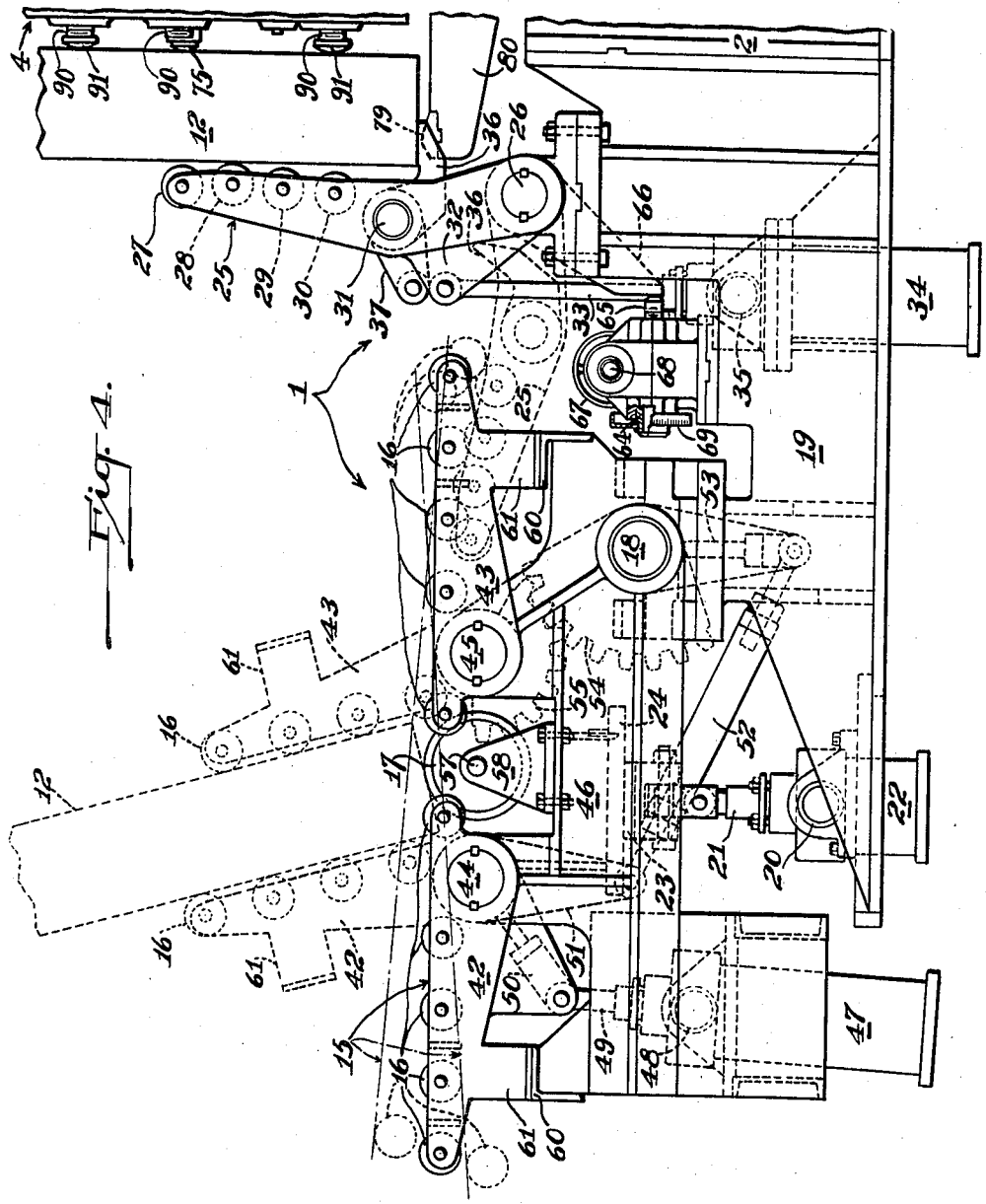
Fig. 4 is an enlarged side elevation of the work manipulating mechanism with a slab shown in a portion of the work holder and showing in more detail that mechanism as shown partially in Fig. 3.

Fig. 4 may now be considered in connection with Figs. 1, 2, and 3 for a description of the slab or ingot manipulator 1. The manipulator 1 serves the functions of horizontally delivering a slab toward or away from a supporting unit 4, vertically placing a slab into or removing it from a supporting unit 4, and inverting a slab when desired.

In Figs. 1, 2, 3, and 4 a slab or slabs 12 are shown in full line, presented to a supporting unit or units 4. Also in Fig. 4 a position of a slab 12 is illustrated in dotted lines at which it is in the process of being inverted by mechanism included in the manipulator 1. Referring now particularly to Fig. 4, the manipulator 1 is comprised of a roller table 15, the upper surface of which is normally comprised of a plurality of rollers 16 and 17. Rollers 16 are supported in pivoted work inverting arms 42 and 43 normally horizontally disposed and supported in laterally spaced relation on pivoted frame 46; and rollers 17 are suitably mounted on shaft 57 supported in bearings 58 in pivoted manipulator frame 46. The composite roller table 15 with frame 46 is hingedly mounted on a shaft 18 located in suitable bearings in a fixed manipulator base 19 at one end and is movably supported at approximately its center by means of a connecting linkage associated with a pressure cylinder 22. The above described mounting of roller table 15 is such that its normally plane upper surface may be slightly inclined either toward or away from the holder 3, as indicated by dotted positions of end rollers 16 in Fig. 4, through the operation of pressure cylinder 22, whereby to cause a slab resting on the table to move by gravity either toward or away from the holder 3.

Also associated with, and forming part of, the manipulator 1 as presently described are a plurality of spaced, parallel work loading arms 25 interleaved longitudinally between inverting arms 43 and pivoted to fixed base 19 adjacent one end of manipulator 1 on shaft 26 to which they are secured, the loading arms 25 bearing a plurality of work-engaging rollers identified by reference numerals 27, 28, 29, and 30, presenting an outwardly convex work-engaging surface; the work-engaging rollers 28, it will be noted, project beyond the longitudinal axis of the loading arms 25 a slight distance greater than do the rollers 27, 29, and 30. The loading arms 25 are adapted to be moved from a substantially horizontal position below the surface of roller table 15, shown dotted in Fig. 4, to a substantially vertical position, shown in full line in Fig. 4, and to be returned, through the operation of a connecting linkage and a pressure cylinder 34.

When a slab 12 resting horizontally on roller table 15 is to be placed into a work supporting unit 4, the work loading arms 25 occupy the horizontal position, with the rollers 27, 28, 29, and 30 forming a surface substantially parallel to the interleaved surface formed by rollers 16 carried by arms 43. The slab 12 assumes a position over loading arms 25 by gravity movement over the previously or then tilted roller table 15, its movement in the direction of the supporting unit 4 being arrested by a plurality of work supporting fingers 36 mounted on loading arms 25, the fingers then being held in a position substantially at right angles to the longitudinal axes of arms 25 by means of a connecting linkage and pressure cylinder 40 (shown in Fig. 6) associated therewith. It is pointed out that fingers 36 in the dotted horizontal position of arms 25, shown in Fig. 4, are retracted and not in the perpendicular position described; their position relative to arms 25 is shown in the full line position of arms 25. Thus a slab 12 resting on a portion of roller table 15 and abutting against fingers 36 may be lifted by loading arms 25 and tilted into vertical position, then deposited on gripping inserts 79 of bottom jaw members 80 in a supporting unit 4, as will be hereinafter described. The fingers 36 are mounted on through shaft 31 common to all arms 25. In the erect position of arms 25, the extended fingers 36 preferably support a slab 12 slightly above lower jaw inserts 79. After the slab has been properly aligned as hereinafter described, the fingers 36 may be retracted with respect to arms 25 by means of pressure cylinder 40 and its connecting linkage so that slab 12 is lowered into gripping position and the arms 25 may then be returned to horizontal position without interference by the positioned slab 12 with fingers 36, i. e. so that fingers 36 will clear the outermost lower edge of slab 12. The supporting surfaces of fingers 36 are preferably smooth so as to facilitate easy sliding of slab 12 thereon during the aligning operation.

The loading arms 25 are necessarily returned to the horizontal position to permit rotation of the holder 3, as will be further enlarged upon, and then the arms 25 may again be brought to the vertical position and the fingers 36 actuated into supporting position, whereupon the arms 25 may be returned again to horizontal position to remove a finished or semi-finished slab from the work holder 3. After a slab has been returned to the roller table 15 as above described, it must then be inverted so that the unfinished surface thereof may be exposed when reloaded for operation of the cutting tool.

For inverting slabs the aforementioned roller table 15 is constructed with pivoted inverting arms 42 and 43, in which the rollers 16 are mounted, and the centrally located series of rollers 17 over which the end of the ingot or slab 12 may rock as it is inverted by motion of the arms 42 and 43 to and from the inclined dotted positions shown in Fig. 4.

The inverting arms 42 and 43 are secured to shafts 44 and 45, respectively, mounted in the pivoted frame portion 46 of the roller table 15, previously identified as pivoted on shaft 18 in fixed base 19 of the manipulator 1. Means for causing rotation of arms 42 from the horizontal to a position less than vertical, and for simultaneously causing rotation of arms 43 to a position slightly beyond vertical is provided in the form of a pressure cylinder 47 mounted on trunnions 48 in suitable bearings in pivoted frame 46 of manipulator 1 and the connecting linkage therefor. A piston rod 49 from pressure cylinder 47 connects to a lever 50 extending from shaft 44 and secured thereto, to which inverting arms 42 are secured, this linkage being adapted to impart a rotary motion to shaft 44. A rotary motion opposite in direction to that applied to shaft 44 by pressure cylinder 47 through the aforementioned linkage is at the same time imparted to shaft 45 through the medium of a crank 51 secured to shaft 44, an adjustable link 52 connected at one end to lever 51, a crank 53 rotatable about shaft 18 to which the opposite end of link 52 is secured, a gear segment 54 fixed for angular movement with lever 53, and a meshing gear segment 55 mounted on and secured to shaft 45.

As will be noted in the drawings, the gear ratio between segments 54 and 55 is such that segment 55, and thereby shaft 45, has a greater increment of angular movement for each increment of angular movement of shaft 44, the cranks 51 and 53 being of the same length. Thus the arms 43 on shaft 45 will be rotated through a greater angle than will arms 42 on shaft 44, both being actuated by the common operating means comprised of pressure cylinder 47 and the connecting linkages associated therewith. The arrangement of arms 42 and 43 and the actuating mechanism therefore is provided so that a slab located in substantially horizontal position near the work holder 3 may be turned up, beyond over-center by arms 43 and allowed to return to horizontal position with arms 42 and thus be inverted as arms 42 and 43 are folded up and unfolded, whereupon the slab may be caused to approach holder 3 and again be loaded into a supporting unit 4, by means of loading arms 25, in a reversed position. As aforementioned, the rollers 17 serve as an abutment over which the slab 12 to be inverted may be rocked. They are preferably freely mounted on a through shaft 57 mounted in bearing members 58 in pivoted frame 46. The lower position of inverting arms 42 and 43 with reference to frame 46 is preferably fixed by means of abutments 60 on frame 46 adapted to support the arms 42 and 43 through projections 61 thereon.

As aforementioned, the whole roller table 15 with frame 46 is movable for slight inclination in either direction about shaft 18 through the medium of pressure cylinder 22. This cylinder 22 is mounted on trunnions 20 located in suitable bearing members in the fixed base 19. A piston rod 21 actuated by pressure cylinder 22 is operable to cause the movement of roller table 15 and frame 46 through the medium of a suitable universal coupling 23 and a cushion 24, preferably of rubber or the like for absorbing shocks. Thus the elevation of the center of table 15 is established by the position of the piston in cylinder 22. It is then preferable and desirable that the piston be approximately at the center of its travel when table 15 is horizontal.

The loading arms 25 are mounted for motion from horizontal to vertical position preferably by being secured to shaft 26, to which motive forces are applied by means of pressure cylinder 34 mounted on trunnions 35 in suitable bearing members located on fixed base 19. The piston of pressure cylinder 34 acts on a piston rod 33 engaging a bracket 32 on an arm 25 and is adapted to cause movement of all the work loading arms 25 through the arm which carries bracket 32 and the shaft 26 to which the arms 25 are secured.

For actuating the fingers 36 there is provided a double-acting pressure cylinder 40 (see also Fig. 6) mounted on trunnions 41 bearing in a yoke 39 secured to the shaft 26. The pressure cylinder 40 actuates the various fingers 36 through the medium of piston rod 38, crank 37, and through shaft 31 to which crank 37 is secured. Thus the fingers 36 are moved with through shaft 31 to which they are secured, the shaft 31 being journalled in arms 25.

The limiting position of arms 25 when moved so that their longitudinal axes are substantially vertical is preferably controlled by means of two adjustable stop pins 65 adapted to abut against dogs 66 keyed to shaft 26 at opposite ends thereof (Fig. 4 shows one set of such stop pins 65 and dogs 66). The stop pins 65 are preferably commonly actuated for adjustable predetermined position by means of a hand wheel 67 on a shaft 68 carrying worms adapted to turn suitable externally toothed nuts 64 to drive the screw threaded stop pins 65 to a predetermined position. Dials 69 are provided on the opposite ends of nuts 64 whereby the setting of stop pins 65 may be calibrated for ready predetermination. The two sets of stop pins 65 and dogs 66 are provided for operation on either end of shaft 26 for accuracy in locating the upper position of arms 25 and to minimize variation in location of arms 25 possible through torsional strain of shaft 26, so that these arms 25 may form a locating surface adapted to predetermine the position of a slab 12 in a work supporting unit 4.

Work supporting units

A slab 12 is placed in a work supporting unit 4 of work holder 3 by means of the work loading arms 25, the projecting rollers 28 being adapted to predetermine the outward location of the outer surface of the slab, since the arms 25 will have a location predetermined by the setting of stop pins 65. As will appear, the location of the outer surface of slab 12 by the position of arms 25 predetermines the amount of material to be surface machined from slab 12.

Each work supporting unit 4 to either of which a slab 12 is presented by the loading arms 25 of the manipulator 1 is comprised of mechanism located generally on one side of a central plane through the axis of rotation of the holder 3. Each unit 4 (see Figs. 5 and 6) includes four gripping jaws 79 in fixed bottom jaw members 80 integral with the body or housing of holder 3, four gripping jaws 79 in movable top jaw members 81 (any two or more upper and lower pairs of which jaws may be selectively employed), pressure cylinders 82 for operating each of the top jaw members 81, two spring bumpers 75 for cushioning the slab 12 as it is placed into a supporting unit 4, and six motorized alignment screws 90 located in the body of holder 3 and cooperatively arranged to locate, align, and back up a slab placed in a supporting unit 4, the alignment screws 90 being disposed with reference to slab 12 in spaced relation opposite the loading arms 25 as they assume their substantially vertical position.

As a slab is brought from the roller table 15 by the loading arms 25 into a supporting unit 4, it engages the two aforementioned horizontally projecting spring bumpers 75. The spring bumpers serve to retain engagement between rollers 28 and slab 12 as the slab is being located and aligned by motorized screws 90, as will be described. The spring bumpers 75, being yieldable, do not interfere with the alignment of the slab 12 by the screws 90 and they also serve the additional useful function of tending to eject the slab 12 when the top jaws 81 are released after completion of a machining operation and when loading arms 25 are in readiness to unload the slab 12.

The bumpers 75 comprise a cylindrical housing 76 secured in the body of holder 3, a sleeve 77 shouldered at its inner end, a coiled compression spring 78, and a bearing button to which reference numeral 75 is directed, the spring acting between housing 76 and the bearing button portion of bumpers 75, which latter is screwed into sleeve 77.

In order to align the slab 12 after it has been presented to the holder 3 and while it is being supported on fingers 36, the plurality of horizontal alignment screws 90 may be motor actuated with their outer ends in a common vertical plane to position against the inner face of slab 12, pressure aligning it in cooperation with rollers 28 on arms 25 and thus both predetermining the depth of material to be removed by the cutter and the plane through which the cutter is to act, that plane being one parallel to the vertically aligned inner face of the slab.

Figure 5:
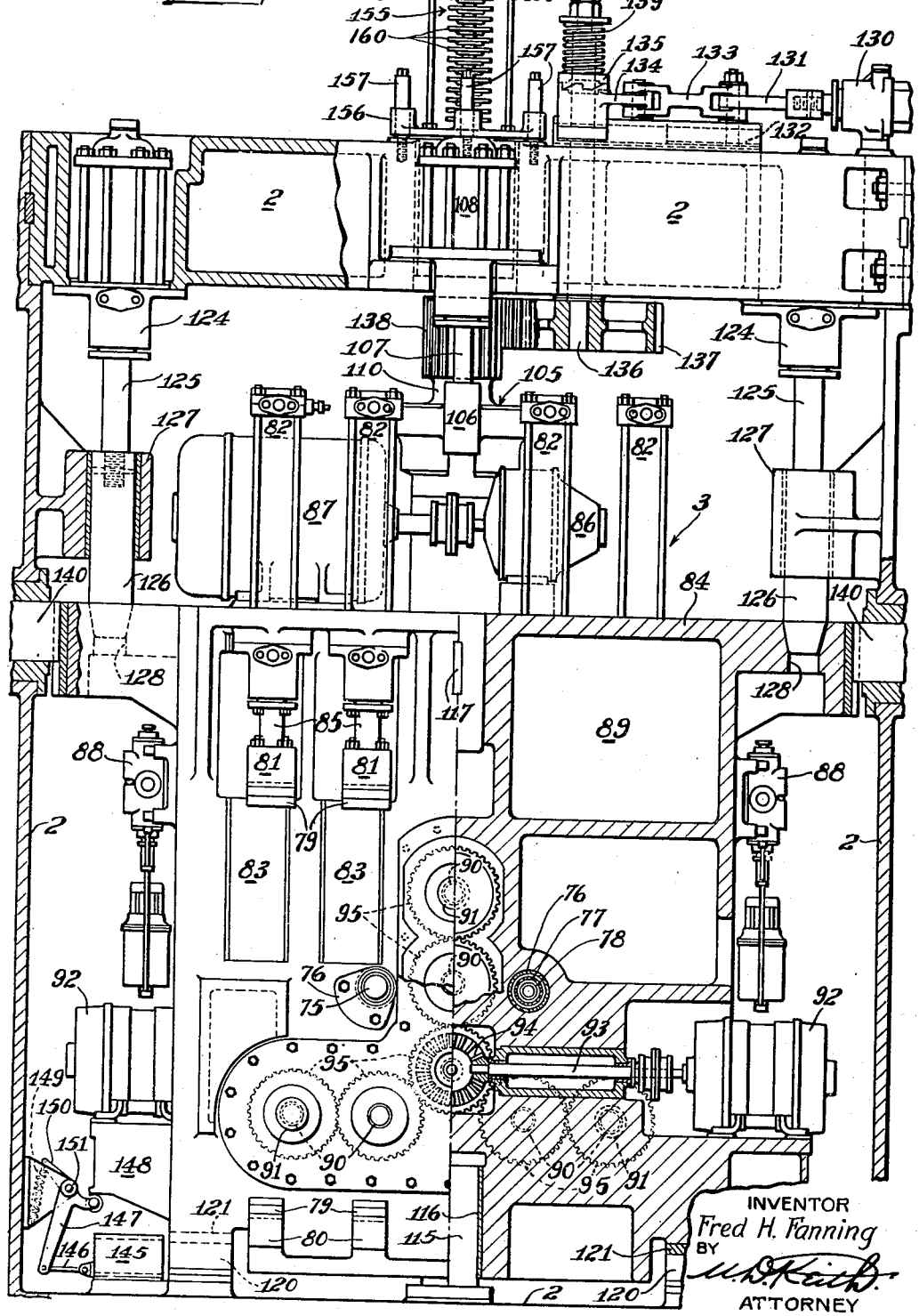
Fig. 5 is an enlarged composite front elevation and section of the work holder showing in more detail one of the work supporting units as viewed in Fig. 2, but without a slab located therein.
Figure 6:
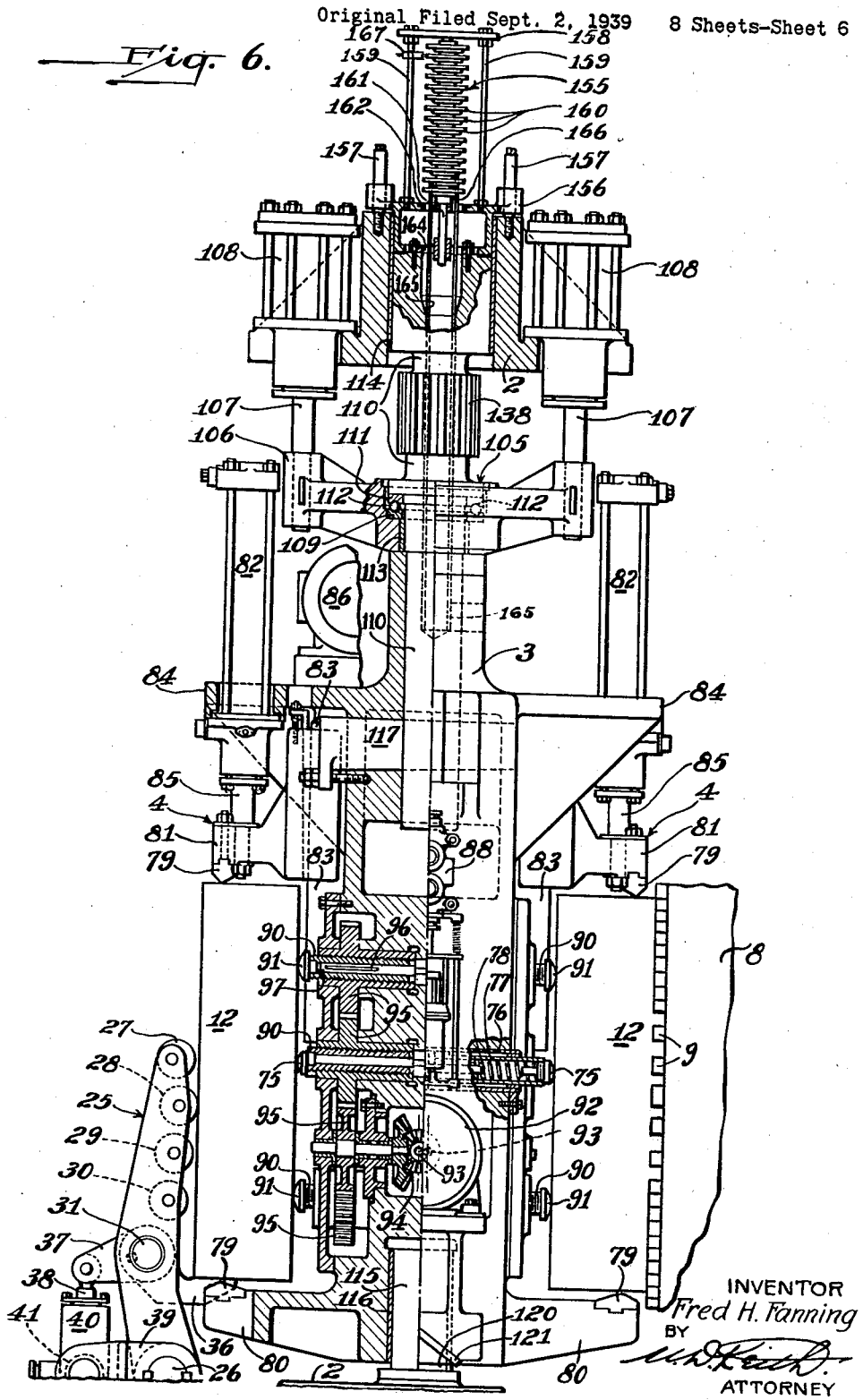
Fig. 6 is a composite side elevation and section of the work holder to the same scale as Fig. 5 with slabs shown therein and showing in more detail a portion of the apparatus shown in Fig. 3.

In the embodiment of the invention shown, referring to Figs. 5 and 6, it will be noted that six alignment screws 90 are provided, but it must be pointed out that for determining a vertically aligned plane for the inner face of slab 12 only three of the screws 90 should preferably be employed. Rather than provide for disengaging means in the driving mechanism for screws 90, the expedient of removable pressure buttons 91 is preferably resorted to, thus any of the six screws may be made operable by the sliding insertion of buttons 91 on selected screws 90, preferably on three of them; more of the screws may be employed if desired, and those selected will be those best adapted to accommodate the particular size of slab 12 to be worked on.

In cases where the work or slabs 12 have regular depressions or projections, buttons 91 of different axial length may be inserted in screws 90, or the screws 90 may be located in gears 95 in different axial position relative to one another. However, as described here, buttons 91 will normally rest in a common vertical plane movable against the inner face of the work. The screws 90 for each individual supporting unit 4 are actuated by means of electric motors 92 mounted in holder 3, through drive shafts 93, bevel gearings 94, and a train of gears 95 journalled in holder 3. In the outer six of the cluster of 7 gears 95 the screws 90 are threadedly supported within internally threaded apertures. Suitable right or left hand threads of like pitch are preferably employed on screws 90 and within outer gears 95 so that a like axial motion of the screws 90 will be imparted thereto by rotation of motors 92, drive shafts 93, bevel gearings 94 and gears 95. Screws 90 are provided with longitudinal bores and keyways so that suitable keys 96 may be inserted in rods 97 passing therethrough and held at one end in the body of holder 3 to prevent rotation of the screws within the internally threaded gears 95.

Motors 92 are preferably of the type known as torque motors, which may be energized to drive screws 90 against the back face of slab 12 with a predetermined force until the motors 92 are stalled. It is desirable that motors 92 be capable of being stalled under full load so that the desired backing up pressure against the back face of slab 12 may be exerted through alignment screws 90, prior to clamping of slab 12 by engagement of the opposed gripping jaws through inserts 79. Suitable time relays not shown in the drawings are preferably provided for automatically cutting off the current to each motor 92 when it has been stalled for a predetermined length of time. It will be apparent that the pitch and thread of the screws 90 in the internally threaded portions of gears 95 may conveniently be such that the screws are self-locking and will not tend to be driven back by back pressure of the slab, if such there be, when a motor 92 has been electrically disconnected.

For convenience and universal automatic use it is desirable that motors 92 be adapted to drive screws 90 back away from work-engaging position after the slab is removed from a supporting unit 4 and before a new slab is repositioned. Suitable well known mechanical and electrical means may be employed for effecting the automatic retraction of the screws 90 in the described manner.

It will appear from the above description that arms 25, and screw 90, which are adapted to be driven in a common plane, align and locate slab 12 with its inner face in proper vertical position for a machining or cutting operation on its outer face, whereupon it is desirable to firmly grip the slab 12 to permit retraction of the loading arms 25 and so that the slab 12 will be firmly held in holder 3 when the same is rotated into the cutting position.

In Figs. 5 and 6 the aforementioned bottom jaw members 80 are shown integral with the body of work holder 3 and are provided with suitable gripping jaw inserts 79. The movable top jaw members 81 are slidably supported on T-shaped guides 83 below flange 84 of holder 3, the jaw members 81 being thereby secured to the body of holder 3 and provided with like suitable gripping inserts 79. The jaw members 81 are each individually actuated by pressure cylinders 82 through piston rods 85, the cylinders 82 being suitably supported on flange 84 integral with the body of the holder 3.

In this embodiment of the invention the cylinders 82 are double acting oil cylinders supplied with oil pressure from pump 86, driven by motor 87, jaws 81 in each unit 4 being controlled by one of two electrically operated piston valves 88 associated therewith. The oil reservoir for the cylinders 82 is provided in a chamber 89 within the holder 3. This arrangement provides a self contained system within the rotatable holder 3, electrically and hydraulically controlled, and hydraulically independent of fixed frame 2, for operating the clamping mechanism of each supporting unit 4 and insuring that even gripping and positive withdrawing forces are exerted by each of the jaw members 81.

*Work holder*

After a slab 12 has been loaded into a work supporting unit 4, the slab located and gripped by the mechanism above described, and the loading arms 25 returned to horizontal position, the work holder 3 must be rotated 180° to present that slab 12 to the cutter 9 and to return a previously machined slab 12 to the loading and unloading position. The holder 3 is mounted in main frame 2 for rotation on a thrust bearing 105. The thrust bearing 105 rests in a yoke 106 suspended from main frame 2 on piston rods 107 connecting to pistons in cylinders 108 secured to the bracketed upper portion of main frame 2. The yoke 106 carries a suitable lower bearing race 109, and the shouldered main shaft 110 of holder 3 bears a cooperating upper bearing race 111 adapted to ride on balls 112 held between the races 111 and 109. The shouldered main shaft 110 is journalled in yoke 106 by means of a suitable sleeve bearing 113 in the yoke 106 located below the thrust bearing 105. This main shaft 110 has an upwardly extending portion journalled for rotatable and vertical sliding movement in sleeve bearing 114 held in the main frame 2 above the yoke 106, and shaft 110 supports the holder 3 including the mechanism carried thereby on its downwardly extending portion to which it is fitted and held by key 117.

The holder 3 is rotatable and vertically slidable at its lower portion on a stub pivot shaft 115 located in the bottom portion of main frame 2 and carries within its body a sleeve bearing 116. Thus vertical and axial alignment of the holder is provided through the medium of journal bearings 114 and 116 and shafts 110 and 115.

For securing the holder 3 against rotation during the machining operation, it is arranged to rest on interengaging portions comprising two inverted V-shaped wedges 120 mounted on main frame 2 and located on either side of stub pivot shaft 115, and suitable cooperative inverted V-shaped bearing seats 121 provided in holder 3. These wedges and bearing seats 120 and 121, respectively, since they interlockingly bear the weight of the holder 3, serve to prevent rotation of the holder 3 and give it rigidity at its lower portion until the same is lifted for turning. For giving additional rigidity to the holder 3 at its upper portion and for holding it down on wedges 120, there are provided two pressure cylinders 124 mounted in the main frame 2 of the apparatus, having connected to piston rods 125 thereof tapered dowel pins 126 slidable in bearings 127 bracketed to the side portions of main frame 2 and arranged so that the dowel pins 126 enter recessed apertures 128 in the flange 84 of holder 3. Cylinders 124 are suitably pressure operated to drive the dowel pins 126 into the apertures 128 above mentioned (see Fig. 5), the taper permitting pressure to be transmitted downwardly to wedges 120 and serving to increase the rigidity of the apparatus.

When it is desired to release the holder 3 for rotation to reverse the relative positions of the supporting units 4, the tapered dowel pins 126 may be withdrawn by means of the aforedescribed pressure cylinders 124 and piston rods 125, but the employment of the V-shaped wedges 120 requires that the holder 3 be lifted so that the bottom portion and bearing seats 121 thereof will clear the wedges 120; and it is for this purpose that the holder 3 is hung from the main frame 2 by means of the aforementioned piston rods 107 actuated by pressure cylinders 108. Thus to permit turning of the holder 3 the cylinders 108 are actuated, after dowel pins 126 have been raised, to lift the yoke 106 by means of piston rods 107, the yoke 106 lifting the holder 3 through thrust bearing 105 and shouldered main shaft 110.

When the work holder has been thus raised so that its bottom portion clears wedges 120, it may then be actuated for rotation. To impart a turning motion to the work holder, there is provided a pressure cylinder 130 (see Figs. 1 and 5), a piston rod 131 pinned to a slidable crosshead 132, a link 133, a crank 134, a spring held latch member 135, a shaft 136, a gear 137, and a pinion 138 mounted on main shaft 110. Through the aforementioned mechanical linkage the piston rod 131 may be actuated by cylinder 130 to push on crank 134 for turning holder 3. The ratchet toothed portion of crank 134 is then adapted to cause rotary movement of the corresponding latching member 135 held by the spring 139 and keyed to shaft 136 to impart to shaft 136 a rotary movement. Thus shaft 136 through gear 137 and pinion 138 will impart rotary movement to the holder 3. Piston rod 131 may be quickly moved a sufficient distance to give turning movement to holder 3, and then it may be withdrawn, the slippage between crank 134 and latching member 135 permitting free rotary movement of holder 3 in the proper turning direction; or the piston rod 131 and linkage associated therewith may be arranged to follow the rotation of holder 3 through its full 180° movement.

For stopping holder 3 and preliminarily locating it, two horizontal latches 140 are located in the main frame 2 on either side of the holder adjacent the apertures 128 for the tapered dowel pins 126. These latches 140 have blunt V-shaped ends, vertically disposed and adapted to engage vertically disposed V-shaped recesses in the flanged portion 84 of holder 3, and they are each spring-held against flange 84 on the recesses by two springs 141 adjustably preloaded by means of screws 142 (Fig. 2). The latches 140 are such that the force imparted by cylinder 130 is sufficient to overcome their holding power against rotary movement, and such that the coasting or final rotary motion of the holder 3 may be arrested thereby. Thus the holder 3 may be stopped on the approach of recessed portions in flange 84 to the latches 140.

When the holder 3 has been turned through an angle of 180° and stopped by the latches 140, it may then be lowered by means of pressure cylinders 108 to rest on the wedges 120, and thereafter the tapered dowel pins may be forced into position by means of cylinders 124 to positively lock the holder 3 in its lowered position.

The ratchet construction between crank 134 and latch 135, employed in connection with the cylinder 130 for causing rotation of the holder, permits return movement of the piston rod 131 without effect upon the work holder and places both in condition for the next 180° rotary movement.

When the holder is raised and rotated the work or slabs 12 pass over the inverted V-shaped wedges 120. In order to protect the surfaces of the wedges 120 from scalpings and chips which might fall onto them during the rotary movement of the holder 3, covers 145 for the wedges 120 have been provided which are adapted to automatically slip over the wedges 120 when the holder is lifted and to be automatically retracted from the wedges when the holder is returned to rest on the wedges. Mechanism for protecting each wedge 120 comprises a cover 145 actuated through a link 146 by a bell crank 147, the other end of which bell crank 147 is adapted to be engaged through a roller by an integral tripper 148 on the bottom portion of the holder 3 (Fig. 5). The bell crank 147 is held against tripper 148 by means of a coil spring 149 attached at one portion to the main frame 2 and at its other end to an extending dog 150 secured to the bell crank pivot shaft 151 in a bracket from frame 2. It will be seen that downward movement of the holder 3 will press bell crank 147 and withdraw the cover 145 from the wedge 120. Likewise upward movement of the holder 3 will permit spring 149 to pull bell crank 147 to oscillate the same on shaft 151 to replace cover 145 over wedge 120.

A collector ring assembly, identified generally by reference numeral 155, is mounted for turning movement on the upper portion of main shaft 110. This assembly is provided as a suitable means for bringing electric power into the work holder 3 whereby electrically thrust valves 88, pump motor 87, and alignment screw motors 92 may be operated, and pressure cylinders 82 and pump 86 actuated independently of any external pressure system. This construction generally provides a self-contained, unitary mechanism.

A base 156 for the collector unit 155 is shown supported within sleeve bearing 114 on shaft 110, and slidable with shaft 110 for vertical movement of holder 3 on vertical pins 157 secured in the upper portion of main frame 2, the pins 157 passing through suitable bosses on base 156 also serving to prevent rotation of base 156 with holder 3. From the upper portion of base 156 a cover plate 158 is preferably supported on four rods 159.

The collector rings 160 are grouped on a central shaft 161 rotatably supported between base plate 156 and cover plate 158 and are electrically insulated from shaft 161 and from each other. The shaft 161 carries a thrust collar 162 adapted to seat on a recessed aperture of base 156. An extending portion of shaft 161 is keyed into a turning plate 164 secured as by bolts to the top of shaft 110. Shaft 110 is provided with a hollow central bore 165 through which individual leads 166 are brought from collector rings 160 to the holder 3. Brushes 167 (one of which is shown in Fig. 6) may be conveniently mounted on rods 159 supported on base 156 for making electrical contact with rings 160. Suitable conductors tapped into leads 166 and connected to the alignment screw motors 92, the pump motor 87 and the electrically operated valves 88 are adapted to electrically control the work aligning and clamping mechanisms.

*Cutter carriage*

After a slab 12 has been loaded into work holder 3, the holder rotated to bring the slab, in a supporting unit 4, around to a position adjacent the cutter 9, and the holder lowered onto wedges 120 and secured by the dowel pins 126, the slab is ready for a surface machining operation to be effected by cutter 9.

Reference is now made to Figs. 7 and 8 in particular and also to Figs. 1, 2, and 3. In these figures the cutter 9 comprises a plurality of cutting tools (not shown in detail) peripherally mounted in cutter head 8. Cutter head 8 is secured to spindle 170 by a suitable threaded and keyed connection at 171, the spindle 170 being supported on cutter carriage 7 by means of two sets of roller bearings 172 and 173. These bearings 172 and 173 incorporate tapered rollers 174 held in suitable bearing races.

The spindle 170 is secured against axial movement with reference to carriage 7 by means of the aforementioned roller bearing 172, the external races of which are secured in bearing member 190 secured to carriage 7; bearing 173 in bearing member 191 is of the floating type for expansion of spindle 170. The spindle 170 is particularly secured at bearing 172 by means of a keyed spanner nut 192 engaging a threaded split nut 193 in spindle 170 and acting against a ring 194 surrounded by a sealing member 195, which latter sealing member 195 is retained by a recessed retainer ring 196 secured to bearing member 190 as by bolts. The thrust bearing arrangement provided is to prevent axial play of spindle 170 which would result in tool chatter marks on the surface of ingot 12.

Cooling and lubricating oil for cutting tools forming cutter 9 is supplied from reservoir 175 by means of suitable pipe lines 176, oil pump 177, flexible line 178, and an internal conduit 179 axially mounted in spindle 170 which rotates thereabout on suitable bearings 238, the conduit leading to an oil distributing orifice 180 at the center of cutter head 8. Flexible line 178 is attached to conduit 179 to deliver oil to orifice or spray nozzle 180 by means of a suitable coupling 181. Pump 177, mounted on a sub-base 197, is driven by an electric motor 182 through suitable gearing 183 and coupling 184.

The cutter 9 is driven by an electric motor 185 through a sheave 186 mounted on the shaft thereof carrying V-belts 187 to a sheave 188 keyed to spindle 170. The motor 185 is adjustably mounted on carriage 7 by take-up screw 189 so that proper tension in V-belts 187 may be preset and slack in the belts eliminated.

The carriage 7 rests on ways 217 and 218 of a sub-base 197, and has limited movement with respect thereto in a direction parallel to the spindle from an advanced cutting position to a retracted position. Sub-base 197, in turn, rests on ways 215 and 216 of carriage foundation bed 6 perpendicular to the spindle and parallel to the longitudinal axis of the work holder 3, and is movable thereon to carry or traverse the cutter past the work and return. The length of this motion may be fixed suitable to the longest slabs to be scalped, but it is preferred to provide several selectable means for automatically stopping, retracting and returning the cutter at different lengths of travel to suit a variey of slab lenghs, which may be in the form of limit switches 239 mounted on bed 6 and actuated by a cam 240 secured to the sub-base 197. This provision increases the capacity of the machine considerably if a wide variation in slab lengths prevails, by reducing the time for the tool to traverse the work holder 3 when scalping slabs of less than maximum length.

The above mentioned motions are imparted to the carriage 7 and sub-base 197 by a hydraulic cylinder 200 and cooperating elements hereinafter to be described in detail. Oil to ways 215 and 216 is supplied from reservoir 201 (Fig. 8) through piping 202, pump 203, and suitable oil lines (not shown). The pump 203 is driven by an electric motor 204 through suitable gearing 205 and coupling 206. The electric motor 204 and pump 203 are mounted on sub-base 197 adjacent to the aforementioned pump 177 and motor 182 for delivering coolant oil to the cutter 9. The aforementioned coolant oil reservoir 175 is suitably located on the bed of the machine or on the floor, and the line 176 is adapted to be traversed over the reservoir during the movement of the cutter carriage 7. Likewise the line 202 entering oil reservoir 201 is adapted to be traversed with the carriage 7, the reservoir 201 being mounted adjacent reservoir 175 on the cutter bed 6. A lubricating oil reservoir 210 is located within carriage 7, oil from which may be circulated to bearings and other parts by means of pump 211 (see Fig. 1) driven by motor 212 through suitable gears and a coupling 214.

Since the cutter 9 must be returned across the face of slab 12 after the surface machining operation, it is desirable that it be retracted before the return movement of the carriage 7, and that it be advanced to a preset position prior to the forward movement of the carriage 7. The feeding cylinder 200 acting on piston rod 207 is adapted to effect automatic advancing, traversing, retracting, and returning of the cutter head 8 and carriage 7 by means of a composite bell crank linkage to be described.

The carriage bed 6 has formed thereon the aforementioned longitudinally extending ways 215 and 216 provided with suitable liners. The way 215 is an inverted V-shaped way for lending lateral rigidity to the sub-base 197 and the way 216 is substantially flat. The sub-base 197 of the cutter carriage is adapted to have longitudinal movement on carriage bed 6 over the ways 215 and 216. In other words, the cutter carriage on sub-base 197 is adapted to have its traversing and return movements over cutter bed 6 in a direction past the work to feed or return the cutter 9. This longitudinal movement of sub-base 197 is imparted by feeding cylinder 200 through piston rod 207 in a manner which will be described in detail hereinafter.

The sub-base 197 carries two laterally extending ways 217 and 218 on its upper portion for slidably supporting the cutter carriage 7. The way 217 is merely flat and the way 218 is an inverted V-shaped way for lending longitudinal rigidity to carriage 7, both ways carrying suitable liners. At the cutter head end of sub-base 197 there is secured a stop 219 adapted to limit the outward movement of cutter carriage 7 on the ways 217 and 218 of sub-base 197.

The carriage 7 is adapted to have lateral movement over it sub-base 197 on the ways 217 and 218, and is adapted to have its axial advancing movement limited through the engagement of an integral wedge 220 with the stop 219 carried on sub-base 197. A suitable stop nut 237 (Fig. 7) is associated with the piston rod 207 and extension rod 235 for limiting the retracting movement of carriage 7 over sub-base 197 as will be described.

As will be seen, movements in two perpendicular directions must be imparted to the carriage 7 and cutter head 8. These movements are effectuated through sub-base 197 movable longitudinally relative to bed 6 and cutter carriage 7 movable laterally relative to sub-base 197 by means of piston rod 207, slidably connected to a crank 225 (Figs. 1, 7, and 8) secured to a shaft 226 journalled in sub-base 197. The turning movement imparted to shaft 226 is carried therethrough to a crank 227 above sub-base 197, the crank 227 being suitably secured to the shaft 226. Crank 225, shaft 226, and crank 227 may be termed a composite bell crank. A connecting link 228 is pinned to the end of crank 227 and at its opposite extremity is pinned to cutter carriage 7 at 229.

The connection between piston rod 207 and crank 225 comprises (see Figs. 1, 7, and 8) a cross head including a sleeve 230 fitted over a portion of rod 207 carrying bosses 231, on which are fitted suitable rectangular bearing members 232 slidable in the end of crank 225. This construction is provided so that piston rod 207 will not be moved out of line by its action on crank 225. For maintaining alignment of piston rod 207, there is provided beyond its point of engagement with crank 225 an extending portion 235, which is suitably guided in a bearing portion 236 of sub-base 197 and carries at its extremity adjustably positioned nuts 237 adapted to be set to determine the retractive travel of carriage 7 with reference to sub-base 197, since it will appear that pulling of piston rod 207 will turn crank 225 only until nut 237 engages the bearing portion 236. Thereafter the piston rod 207 will pull the sub-base 197 directly without further lateral movement of carriage 7. The advancing movement of carriage 7 could be controlled by means of a stop placed on extension rod 235 adjacent to crank 225, but it is preferable to employ the wedge and stop 220 and 219, respectively, in order to assure an accurate solid forward positioning of cutter head 8 and carriage 7. In the preferred embodiment of this feature of the invention crank 225 is substantially longer than crank 227 to insure positioning of the cutter head laterally before the sub-base 197 is moved.

Mention has been made of selective means for predetermining the stroke of cylinder 200 as by limit switches 239, and of provision for advancing the cutter at a suitable cutting rate and returning it at a suitable faster rate. It will be understood, of course, that any preferred type of electrical and hydraulic equipment may be used for this purpose, such equipment being well known and requiring no elaboration.

Operation

The preferred cycle of operations with which the presently described embodiment of the invention is employed is as follows: A slab 12 may be brought to the manipulator 1 in horizontal position by means of a suitable conveyor longitudinally extending back of manipulator 1 and interleaved therewith if desired, or the slab 12 may be deposited upon the roller table 15 of manipulator 1 by a suitable crane and tongs or other means. Assuming that the slab will be at rest on the rollers 16 on the inverting arms 42, it may be caused to slide over to the rollers 16 on the inverting arms 43 by inclining the table 15 by means of the pressure cylinder 22 acting on the pivoted frame 46. The slab will roll then toward the loading arms 25 and will come to rest against the fingers 36, the arms 25 then being in substantially horizontal position shown dotted in Fig. 4, but with fingers 36 perpendicular. The arms 25 will then be rotated through approximately 90° to carry slab 12 from a horizontal position to a vertical position where it will be supported on fingers 36.

The upward position of loading arms 25 will have been predetermined by a setting of stop pins 65, and therefore the outermost set of projecting rollers 28 will predetermine the outward position of slab 12, against which slab 12 will be located and pressed by the outward driving movement of motorized alignment screws 90. Preferably three of these screws 90 will be provided with contacting buttons 91, such screws being selected as will best accommodate the size of slab 12 being located in holder 3. When screws 90 have been moved to their stalled position, the motor 92 driving the same will come to rest under full torque and then will be electrically disconnected. The fingers 36 will then be retracted, lowering slab 12 onto lower jaw inserts 79. Opposed upper jaw inserts 79 will then be brought into engagement through action of cylinders 82 on jaw members 81 to securely clamp slab 12 in unit 4 in aligned and indexed position at a predetermined distance from the axis of rotation of holder 3.

After slab 12 has been gripped in a supporting unit 4, the loading arms 25 may then be withdrawn from the face of ingot 12 and returned to substantially horizontal position interleaved with the arms 43 of manipulator 1.

At this point the holder 3 will be ready to be rotated, and for this purpose the dowel pins 126 will be lifted by means of cylinders 124. Thereupon the work holder body or housing 3 will be lifted by means of cylinders 108 and the holder will be rotated by the action of cylinder 130 through gear 137 and pinion 138 on the main shaft 110 of the work holder 3. The holder will be given an angular momentum by cylinder 130 and will turn through an angle of 180°, whereupon it will be snap-locked by latches 140 adapted to preliminarily locate the holder as it is lowered by release of pressure on cylinders 108 so that it may rest on wedges 120.

The holder is then more securely located through the re-engagement of dowels 126 within apertures 128 in the upper flange 84 of holder 3 by the action of cylinders 124. At this position the holder is secured for the surface machining operation and the slab or ingot is ready to be scalped or surface machined by the cutting tool 9 in cutter head 8. Immediately upon the location of the holder as aforementioned, the cutter head 8 may be automatically advanced axially on carriage 7 over ways 217 and 218 by the initial movement of piston rod 207 actuated by feeding cylinder 200. When the cutter head 8 has been advanced properly and stopped by the engagement of wedge 220 with stop 219, the further movement of piston rod 207 by the action of feeding cylinder 200 will cause the cutter head 8, cutter carriage 7, and sub-base 197 to be longitudinally traversed over ways 215 and 216.

Suitable means may be provided to cause a rapid traverse approach of cutter head 8 to the slab 12 and for thereafter causing the cutter head 8 to be traversed at a working rate as it machines a surface of the slab 12. When the cutter head 8 has passed beyond the slab 12 a sufficient distance for complete machining thereof, the return action of feeding cylinder 200 on piston rod 207 will immediately retract the cutter head 8 outwardly away from the cutting plane and thereafter return the cutter carriage 7 to the starting position through the medium of crank 225, shaft 226, crank 227, and link 229, the extension rod 235 and nut 237 then abutting against and pulling on bearing member 236. It is also possible to provide suitable means for causing the return movement of cutter head 8 and carriage 7 to be effectuated at a rapid rate. Upon the return of cutter head 8 toward starting position, the holder 3 may be immediately rotated 180° as aforedescribed to present a new slab 12 to the cutter 9, whereupon the cutting cycle may be reinstituted in the same manner as described for the previous slab. Prior to the reinstitution of the cutting cycle immediately abovementioned, a second slab will have been placed upon manipulator 1 and loaded into holder 3 in the manner first described.

Returning to the cycle of operations with respect to the first slab 12 loaded into the machine, this slab 12 will now have been returned to the position adjacent manipulator 1. While the second slab 12 is being machined by the cutter 9, the first slab 12 may then be withdrawn from its supporting unit 4 by the raising of the loading arms 25 to the vertical position, whereupon the lifting fingers 36 may be raised to rest under the slab 12. Then the arms 25 may be returned to horizontal position carrying the slab 12 back to rest upon the rollers 16 in the inverting arms 43. At this point the slab 12 is ready to be inverted so that its second surface may then be surface machined. For inverting the slab 12 the inverting arms 42 and 43 are raised to the dotted position shown in Fig. 4, the arms 43 carrying the slab 12 up and over a vertical center position; then the arms 42 and 43 may be returned to horizontal position, the slab 12 following arms 42 and then resting in the position first described, except that the opposite unmachined surface then will be in contact with the rollers 16 in arms 42.

At this point the cycle of operations first described may be reinstituted, the slab caused to approach loading arms 25, the loading arms 25 caused to reload the slab 12 into a supporting unit 4, and the slab 12 suitably located and gripped therein. In this position the slab will present its second face for a second machining operation which may be immediately instituted upon the completion of the first machining operation on the second slab 12 then being acted upon by cutter 9. Thereafter the operation of the machine may be made continuous by the removal of slabs machined on both sides and the further supply of unmachined slabs to the manipulator 1.

It is to be noted that this cycle of operations permits of loading, unloading, and inverting one slab while a second slab is being machined so that the cutter 9 may be operated at its fullest efficiency and will not have to await any of the loading, unloading, and inverting operations but may be immediately returned to working operation after it has been retracted and returned to its starting position following each preceding machining operation.

The appended claim is intended to be expressive of the novel features and arrangements of parts forming the present invention, it being understood that various modifications may be made in the preferred embodiment thereof here shown and described without departing from its nature or scope.

What is claimed is:

A method of scalping sheet ingots and slabs wherein one work piece may be scalped while one or more other work pieces may be unloaded, inverted, and loaded, comprising aligning and securing a work piece to present a face thereof substantially in a predetermined plane and to present an opposite face thereof in a plane spaced from and parallel with the plane of a working tool, rotating the work piece about an external axis to bring the first mentioned face thereof into substantial coincidence with the working plane of the working tool, effecting relative movement between the working tool and the first mentioned face of the work piece while simultaneously aligning and securing another work piece in manner similar to the first, rotating both work pieces about the same axis to bring the second into working position and to return the first to the aligning and securing position, effecting relative movement between the working tool and the second work piece while simultaneously removing and replacing in reverse position the first work piece and aligning and securing the same, rotating both work pieces about the same axis to bring the first again into working position but with its unworked face presented for working and to return the second for the first time to the aligning and securing position, effecting relative movement between the working tool and the first work piece, and continuing the process with successive work pieces.

FRED H. FANNING.